(12) United States Patent
Fung et al.

(10) Patent No.: US 8,392,236 B2
(45) Date of Patent: Mar. 5, 2013

(54) MOBILE NETWORK DYNAMIC WORKFLOW EXCEPTION HANDLING SYSTEM

(75) Inventors: Casey K. Fung, Kent, WA (US); Patrick C. Hung, Oshawa (CA)

(73) Assignee: The Boeing Company, Chicago, IL (US)

( * ) Notice: Subject to any disclaimer, the term of this patent is extended or adjusted under 35 U.S.C. 154(b) by 2077 days.

(21) Appl. No.: 11/128,828

(22) Filed: May 13, 2005

(65) Prior Publication Data

US 2006/0259341 A1 Nov. 16, 2006

(51) Int. Cl.
*G06Q 10/00* (2012.01)
(52) U.S. Cl. ..................... 705/7.27; 705/7.26
(58) Field of Classification Search ............... 705/7.26, 705/7.27
See application file for complete search history.

(56) References Cited

U.S. PATENT DOCUMENTS

| | | | | |
|---|---|---|---|---|
| 2002/0065885 A1* | 5/2002 | Buonanno et al. | ............ | 709/205 |
| 2002/0143819 A1* | 10/2002 | Han et al. | ............ | 707/513 |
| 2003/0058277 A1* | 3/2003 | Bowman-Amuah | ............ | 345/765 |
| 2004/0170155 A1* | 9/2004 | Omar et al. | ............ | 370/349 |
| 2005/0131750 A1* | 6/2005 | Kogan et al. | ............ | 705/9 |

OTHER PUBLICATIONS

Attack Modeling for Information Security and Survivability. 5. Funding Nos. F19628-00-C-0003. 6. Author(s). Andrew P. Moore, Robert J. Ellison, . . . www.itsec.gov.cn/docs/20090507164628959972.pdf.*
D. K. W. Chiu, Q. Li and K. Karlapalem, "A Meta Modeling Approach for Workflow Management System Supporting Exception Handling," Information Systems, vol. 24, No. 2, pp. 159-184, May 1999.*
D. K. W. Chiu, Q. Li and K. Karlapalem, "Facilitating Exception Handling with Recovery Techniques in ADOME Workflow Management System," Journal of Applied Systems Studies, vol. 1, No. 3, pp. 467-488, 2000.*
Author(s). Andrew P. Moore, Robert J. Ellison, Attack Modeling for Information Security and Survivability. 5. Funding Nos. F19628-00-C-0003. 6. www.itsec.gov.cn/docs/20090507164628959972.pdf.*
Borgida and T. Murata, "Tolerating exceptions in workflows: a unified framework for data and process,"Proceedings of WACC'99, 1999.*
G. Wange and C. Fung, "Architecture Paradigms and Their Influences and Impacts on Component-Based Software Systems," Proceedings of 37$^{th}$ Hawaii International Conference on System Sciences (HICSS-37), Hawaii, Jan. 6-9, 2004.

(Continued)

*Primary Examiner* — Jonathan G Sterrett
*Assistant Examiner* — Luis Santiago
(74) *Attorney, Agent, or Firm* — Harness, Dickey & Pierce, P.L.C.

(57) ABSTRACT

An exception handling system and method are provided for dynamically recovering from a workflow exception occurring in a mobile network communication system. The system has multiple workflows and at least one mission critical item. An attack tree modeling analyses is performed to identify the mission critical item. Another operation includes writing a plurality of forward recovery rules to protect the mission critical item using a transaction datalog fragment of transaction logic. The recovery rules are enabled through an engine in communication with the mobile network communication system. The multiple workflows are monitored for indication of a system attack on any one of the multiple workflows. A new workflow is automatically generated upon detection of the system attack. The exception handling system is overlayed on the mobile network.

8 Claims, 8 Drawing Sheets

OTHER PUBLICATIONS

C. Fung, S. Uczekaj, G. Wang, and S. Moody, "The Evolution of Composition Framework in a Distributed System Toolkit," IEEE International Conference on Web Services (ICWS 2004), San Diego, Jul. 6-9, 2004 IEEE Computer Society Press, Los Alamitos, CA, 2004.

IBM Corporation, "Business Process Execution Language for Web Services (BPEL4WS)," Version 1.1, May 5, 2003.

A. Aiken, J. Widom and J. M. Hellerstein, "Behavior of Database Production Rules: Termination, Confluence, and Observable Determinism," Proceedings of the ACM SIGMOD Conference on Management of Data, pp. 59-68, 1992.

A. J. Bonner, "Workflow, Transactions, and Datalog," Proceedings of the $18^{th}$ ACM Symposium on principles of Database Systems (PODS), pp. 294-305, May-Jun. 1999.

A. Borgida and T. Murata, "Tolerating Exceptions in Workflows: a Unified Framework for Data and Processes," Proceedings of WACC'99, pp. 59-68,1999.

F. Casati and G. Pozzi, "Modeling Exceptional Behaviors in Workflow Management Systems," Proceedings of International Conference on Cooperative Information Systems (CoopIS'99), 12 pgs, 1999.

D. K. W. Chiu, Q. Li and K. Karlapalem, "A Meta Modeling Approach for Workflow Management Systems Supporting Exception Handling," Information Systems, vol. 24, No. 2, pp. 159-184, May 1999.

D. K. W. Chiu, Q. Li and K. Kalapalem, "Facilitating Exception Handling with Recovery Techniques in ADOME Workflow Management System," Journal of Applied Systems Studies, vol. 1, No. 3, pp. 467-488, 2000.

D.K.W. Chiu, Q. Li and K. Karlapalem, "Web Interface-Driven Cooperative Exception Handling in ADOME Workflow Management System," Information Systems, vol. 26, No. 2, pp. 93-120, 2001.

S. Y. Hwang, S. F. Ho and J. Tang, "Mining Exception Instances to Facilitate Workflow Exception Handling," Proceedings of the $6^{th}$ International Conference on Database Systems for Advanced Applications, pp. 45-52, 1999.

N. Mead, R. Ellison, R. Linger, T. Longstaff, J. McHugh, "Survivability Network Analysis Method," CMU/SEI-2000-TR-013, Sep. 2000.

A. Moore, R. Ellison, R. Linger, "Attack Modeling for Information Security and Survivability," DMU/SEI-2000-TN-001, Mar. 2001.

A. D. Keromytis, V. Misra, and D. Rubenstein, "SOS: An Architecture for Mitigating DDoS Attacks," IEEE Journal Selected Areas in Communications, special issue on Recent Advances in Service Overlay Networks, 22(a):176-188, Jan. 2004.

S. Y. K. Hung, "Implementation and Performance of Transaction Logic in Prolog," Master's thesis, Department of Computer Science, University of Toronto, 1996.

* cited by examiner

*Graphical:* 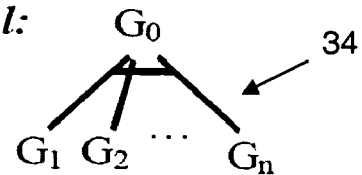
*Textual:* Goal $G_0$
    $AND$   $G_1$
            $G_2$
            . . .
            $G_n$
Fig. 3A        Fig. 3B
*Graphical:* 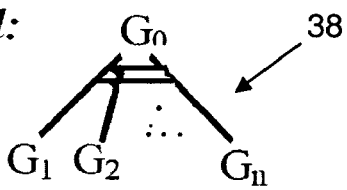
*Textual:* Goal $G_0$
    $OR$   $G_1$
           $G_2$
           . . .
           $G_n$
Fig. 4A        Fig. 4B
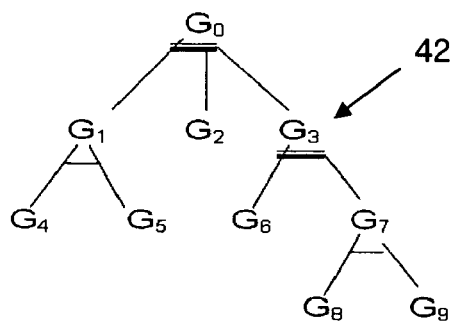
generates the
intrusion scenarios
$(G_4, G_5)$
$(G_2)$
$(G_6)$
$(G_8, G_9)$
Fig. 5A        FIG. 5B

MOBILE NETWORK DYNAMIC WORKFLOW EXCEPTION HANDLING SYSTEM

FIELD OF THE INVENTION

The present invention relates in general to distributed software systems and more specifically to a method for creating survivable distributed workflow systems for mobile networks.

BACKGROUND OF THE INVENTION

In recent years, the area of mobile computing in wireless networks has seen explosive growth both in terms of the number of services provided and the types of technologies that have become available, as evidenced by cellular phones, PDA's, Wi-Fi, Grid and RFID technologies. Distributed software systems for mobile computing are employed to communicate over a wide range of communication networks, including the Internet. One example of a distributed software system used or proposed for formal specification of business processes and interaction protocols is Business Process Execution Language for Web Services (BPEL). BPEL defines an interoperable integration model that facilitates expansion of automated process integration in both intra- and inter-corporate environments.

In addition to one key feature of functionality for business and other distributed software systems, another key feature for maintaining distributed systems is survivability. Survivability is defined as the capability of a service to fulfill its missions in a timely manner, even in the presence of attacks, accidents, or failures due to constant topological changes and unreliable communication channels. For simplicity, attacks, accidents, and/or failures are combined herein under the term "attack". There are three key survivability properties: resistance, recognition, and recovery. Recovery is the capability to maintain critical components and resources during attack, limit the extent of damage, and restore full services following attack.

Because of the severe consequences of failure, organizations are focusing on service survivability as a key risk management strategy for business processes. One approach to meet this challenge is to consider a system at the overlay network level to be a composition of services. Each service makes its functionality available through well-defined or standardized interfaces. This approach yields a Service-Oriented Architecture (SOA) in which services are fundamental elements that can be independently developed and evolved over time. An SOA consists of services, their compositions, and interactions. Each service is a self-describing, composable, and open software component. SOAs typically involve layers of services each with a defined goal and functionalities. For wireless activities as an example, the wireless environment reacts rapidly to services attacks, therefore both recovery and adaptive mechanisms are required to maintain survivability. Using business processes as an example, known business process descriptions require the specification of both the normal workflow and the possible variations in workflow due to "exception" situations that can be anticipated and monitored. Normal workflow variations can be anticipated and dealt with at the process level. An exception is a special event that deviates from normal behavior or prevents normal process execution. Exception situations are generally unanticipated or attack situations which require a more adaptable approach for survivability.

Workflow management is the specification, decomposition, execution, coordination and monitoring of workflows. A workflow management system (WFMS) is the middle-ware to support workflow management. Workflow management is generally provided in a software system designed to support interoperable application-to-application interaction over a network. When the network is distributed over one or more Web services, however, problems can occur when the topology of one or more network nodes change, for example when communication between a fixed or ground based station is interrupted as a mobile platform such as an aircraft changes position relative to the ground based station. Exceptions occurring in workflows associated with Web services as a result of a system attack currently involve human intervention to resolve and are identified as "exception handling" techniques.

Exception handling techniques are known which deal with the recovery aspects of survivability, but which are not pre-emptive or capable of adaptably reacting to exception situations in terms of workflows. For example, Hwang et al. in the article "Mining exception instances to facilitate workflow exception handling", published in *Proceedings of the 6$^{th}$ International Conference on Database Systems for Advanced Applications*, pp 45-52, 1999, provide a rule base that consists of a set of rules for handling exceptions. If none of the rules match the current exception, a search on the previous experience in handling similar exceptions is conducted. Algorithms are also described to identify the exception records by classifying the kind of information about exceptions, defining the degree of similarity between two exceptions, and searching similar exceptions. An improved approach to handling exception situations occurring due to workflow attack(s) is therefore required. Similarly, F. Casati and G. Pozzi in their article "Modeling Exceptional Behaviors in Workflow Management Systems", published in *Proceedings of International Conference on Cooperative Information Systems* (CoopIS'99), 1999, present a methodology for modeling exceptions by means of activity graphs. The taxonomy of expected exceptions are described by categorizing and mapping them into activity graphs. Also shown is how to handle the exceptions in each class. Further provided are methodological guidelines to support exception analysis and design activities. None of these works, however, provide a formal approach to describe exception flows in terms of workflow in mobile environments, and none provide a standardized language for capturing the knowledge of exception handling or a standardized framework to support exception handling in a distributed environment.

SUMMARY OF THE INVENTION

According to one preferred embodiment for a mobile network dynamic workflow exception handling system of the present invention, an exception handling method for dynamically recovering from a workflow exception occurring in a mobile network communication system, the system having multiple workflows and at least one mission critical item, includes an operation for monitoring the workflows. Another operation includes identifying an exception occurring to a first one of the workflows following an attack on the critical item. A further operation includes automatically applying a forward recovery procedure to operably revise the first one of the workflows into a new workflow. The exception handling system is overlayed on an ad-hoc mobile network.

According to another preferred embodiment, an exception handling method for dynamically recovering from a workflow exception occurring in a mobile network communication system, the system having multiple workflows and at least one mission critical item, includes an operation of creating a workflow specification for a plurality of items. A next operation includes performing attack tree modeling analyses to identify the mission critical item. Another operation includes writing a plurality of recovery rules to protect the mission critical item using a transaction datalog fragment of transaction logic. A further operation includes enabling the recovery rules through an engine in communication with the mobile network communication system. A still further operation includes monitoring the multiple workflows for indication of a system attack on any one of the multiple workflows. A yet still further operation includes automatically generating a new workflow upon detection of the system attack.

According to still another preferred embodiment, an exception handling system for dynamically recovering from a workflow exception occurring in a mobile network communication system includes a plurality of recovery rules prepared in a forward recovery logic. An engine is operable to receive and save the plurality of recovery rules. A UDDI service is in communication with the engine. A plurality of workflows of the communication system are in communication with the engine. A BPEL language communication engine is also in communication with the engine which is operable to communicatively connect the engine with at least one web service. Upon identification of a workflow exception occurring to one of the workflows the engine is operable to apply at least one of the recovery rules to maintain communication between the engine and the at least one web service.

A mobile network dynamic workflow exception handling system of the present invention provides several advantages. By providing adaptive measures at the service overlay level for distributed software systems, multiple types of devices can be inter-operable and each can individually recover from system attacks or signal degradation due to movement of the nodes. The end-to-end methodology of the present invention captures initial results from attack tree modeling to develop recovery rules for critical system items. The recovery rules can be applied dynamically using forward recovery when system exceptions occur, including exceptions caused by attacks. The system of the present invention is capable of dynamically generating new workflows for distributed software systems and is therefore functional to improve survivability and recovery from system attacks.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 3A is a graph of an AND-decomposition attack tree of the present invention;

FIG. 3B is a textual representation of the AND-decomposition attack tree of FIG. 3A;

FIG. 4A is a graph of an OR-decomposition attack tree of the present invention;

FIG. 4B is a textual representation of the OR-decomposition attack tree of FIG. 4A;

FIG. 5A is a graph of an AND/OR-decomposition attack tree of the present invention;

FIG. 5B is a textual representation of the AND/OR-decomposition attack tree of FIG. 5A;

DETAILED DESCRIPTION OF THE PREFERRED EMBODIMENTS

The following description of the preferred embodiments is merely exemplary in nature and is in no way intended to limit the invention, its application, or uses.

Figure 1:
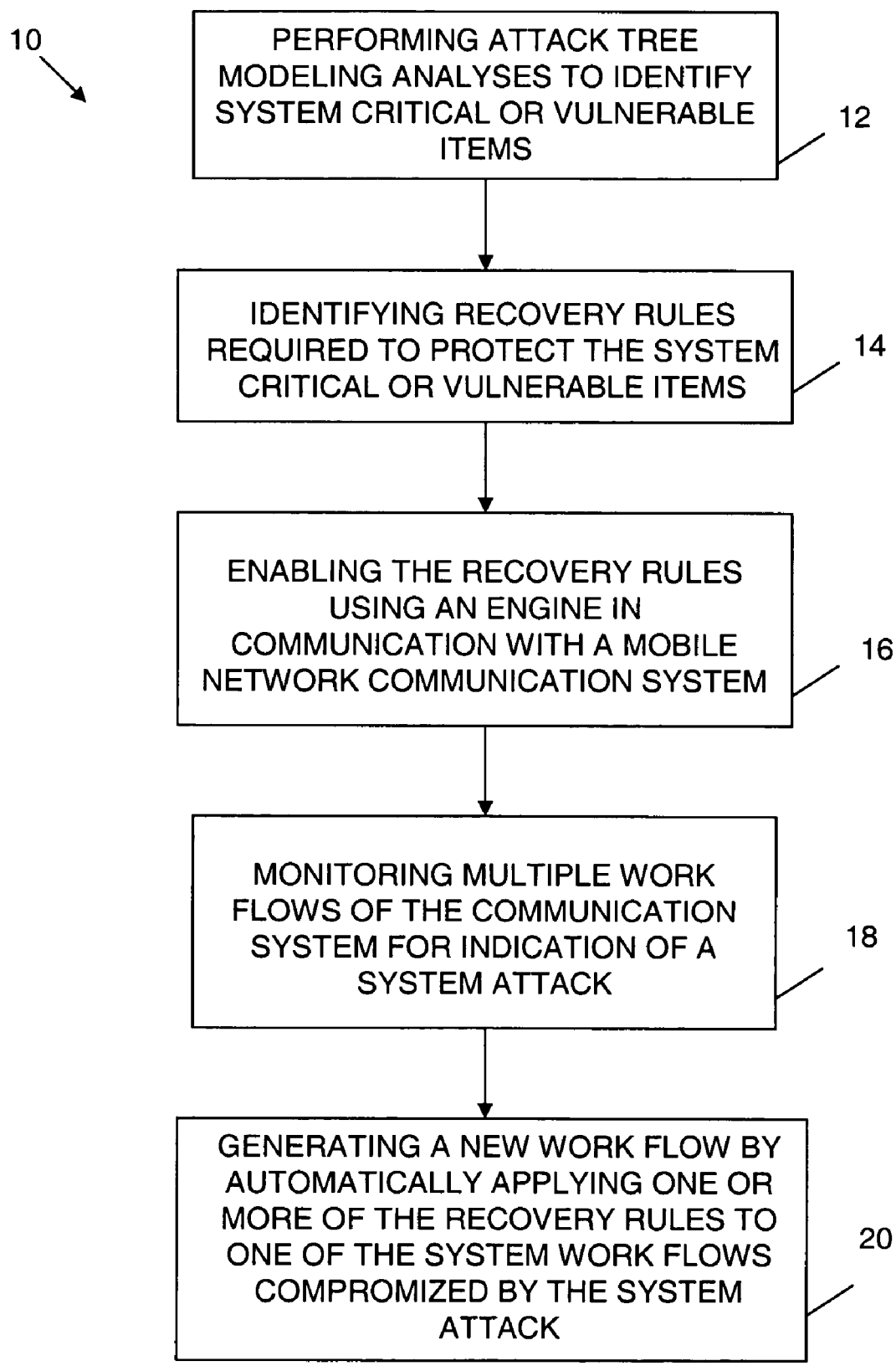
FIG. 1 is a flow diagram identifying operations to provide a mobile network dynamic workflow exception handling system of the present invention.

According to one preferred embodiment of a mobile network dynamic workflow exception handling system 10 of the present invention, and referring generally to FIG. 1, in a first operation 12, attack tree modeling analyses are conducted to identify mobile network system critical or vulnerable items which may be susceptible to an "attack". Attack scenarios are prepared and evaluated during this operation. As previously noted, the term "attack" as used herein broadly refers to system attacks such as by a person, computer virus, worm, or the like, accidents, and/or failures of the system or individual services identified with the system. In an operation 14, recovery rules are defined based on the possible attack scenarios identified in operation 12. The recovery rules are provided to protect the system critical or vulnerable items by providing for exception handling for exceptions which occur due to a system attack. In a next operation 16, the recovery rules are enabled for a distributed system. In a following operation 18, dynamic workflows of the distributed system are continuously monitored for development of system exceptions. Finally, in an operation 20, one or more new workflows are generated to recover from and/or adapt to any system exceptions which develop for the existing system workflows of critical system items. The new workflow(s) is/are generated dynamically, that is, one or more of the recovery rules applicable to the system exception are automatically applied using forward recovery logic language identified herein to create a new workflow.

Prior to performing any attack tree modeling, a workflow specification phase is conducted. Exceptions which can occur to data workflows are defined as exception-flows. In the specification phase, any exception-flows generally refer only to the expected exceptions that can be predicted before the workflow is executed. In a workflow execution phase, however, the exception-flows are not only composed of the expected exceptions, but can also include any unexpected events. The exception-flows between both specification and execution phases in terms of events can be represented in the format of set theory as follows:

$$\text{Spec-Phase(exception-flows)} \subseteq \text{Exec-Phase(exception-flows)}$$

The above statement provides that the set of events included in the exception-flows in the specification phase is equal to or a subset of the set of events included in the exception-flows in the execution phase.

Situations which can create exception-flows can be caused by system failures, or may be related to the semantics of the activity, such as when a deadline of an activity expires. In many cases, exceptions may cause denial of services. Denial of services also refers to the loss of system availability due to accidental or malicious user actions. In general, there are two types of exceptions in the present workflow model: expected exceptions and unexpected exceptions. Expected exceptions are predictable deviations from the normal behavior of the workflow. In the present workflow model, there are four categories of expected exceptions:

1. Control exceptions are raised with respect to control-flows such as the start or completion of any activities.
2. Data exceptions are raised with respect to data-flows such as data integration processes.
3. Temporal exceptions are raised with respect to both control-flows and data-flows, such as the occurrence of a given timestamp of a pre-defined interval elapsed.
4. External exceptions are raised with respect to control-flows and data-flows explicitly occurring in external services, and include exceptions such as system failures.

External and temporal exceptions are in general asynchronous, while control and data exceptions normally occur synchronously with activity executions. Unexpected exceptions mainly correspond to mismatches between an activity specification and its execution and can result in an activity failure. In some known systems, human intervention is an important factor in the exception-handling mechanism for unexpected exceptions. Human intervention, however, is not completely effective in providing for survivability from unexpected exceptions.

Activity failure is defined as one or more activities that have failed or are unavailable for execution. In general, there are three common exception-handling procedures (which currently rely at least in part on human intervention to resolve), used to respond to activity failure(s):

1. Remedy: The workflow designer can debug or modify the activity to resume its execution, in which other activities are not affected. Common examples include repairing damaged data, or eliminating an illegal operation such as division by zero in the query. Recovery from a dead loop occurring during the execution of an activity is a further example.
2. Backward Recovery: This is normally performed by compensating completed operations in the reverse order of their forward execution. The problematic activity may have to roll back to the original state before it is re-executed.
3. Forward Recovery: The workflow designer assigns an alternate execution path to replace a problematic activity. The problematic activity may have to be rolled back to the original state before the alternate execution path can be performed. Other approaches include tolerating the inconsistencies, which have to be explained before the workflow activity execution can proceed.

The problems associated with mobile network signal loss due to nodes moving from point to point require resolution at much greater speed than is provided in human intervention exception-handling procedures. For example, in fire fighting, emergency response, and/or military operations, and during mobile platform (such as aircraft) travel, loss of mobile network connection can occur because the node can be continuously moving or outside of a node interface connection with the network. System attack further increases the difficulty faced by these critical operations for survivability. It should be evident that human intervention can be too slow or unavailable to support survivability and recovery from attacks to these operations. The forward recovery exception-handling procedure noted above is utilized and improved by the exception handling system 10 of the present invention, providing a system which does not require human intervention.

Figure 2:
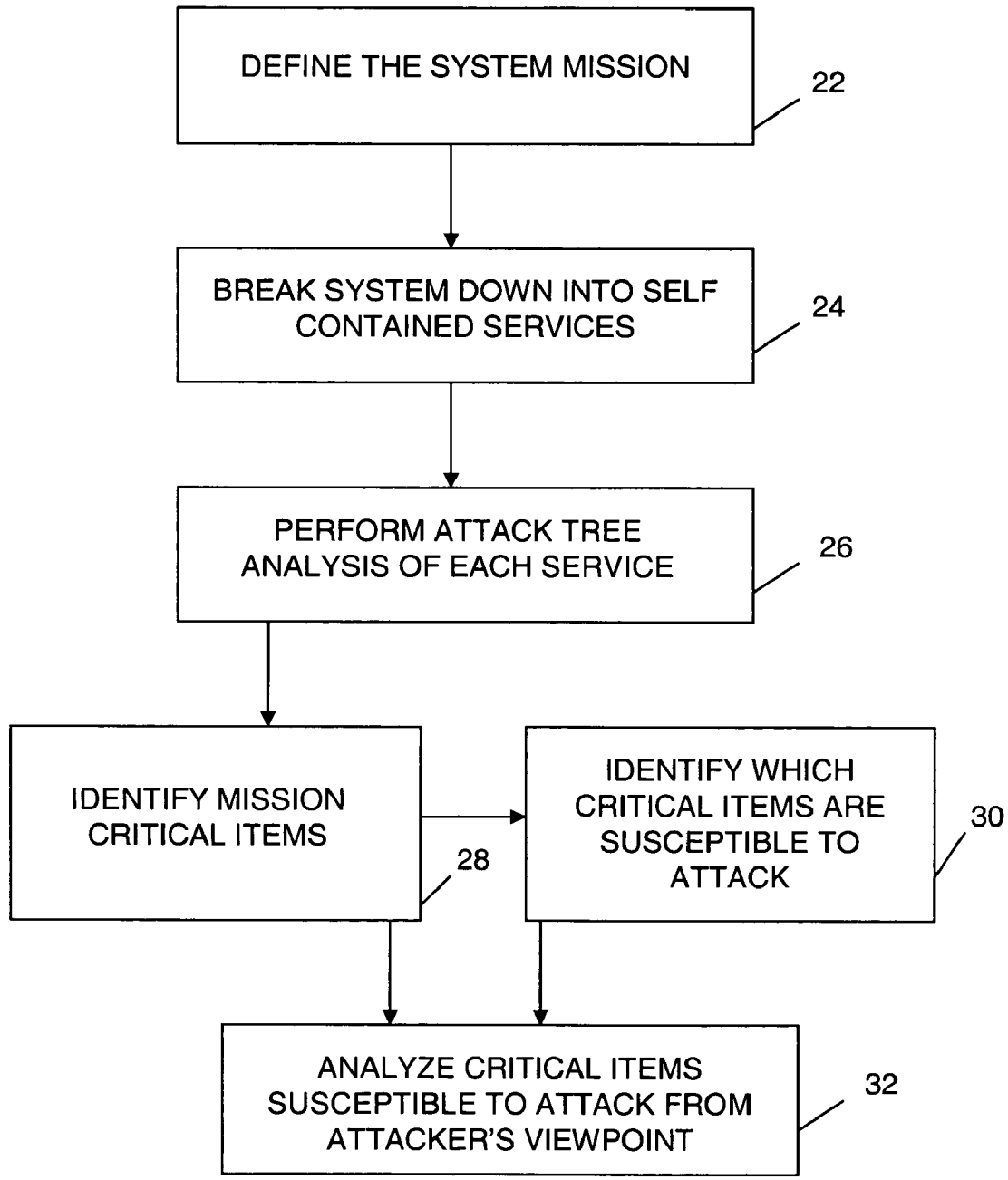
FIG. 2 is a flow diagram identifying operations performed to identify and analyze critical items of a system of the present invention.

Referring now generally to FIG. 2, the following operations are conducted in an end-to-end methodology in analyzing the survivability of a program or service for exception handling system 10 of the present invention. A first operation 22 focuses on the program mission objectives to define the system mission. Any violation of the mission can result in a compromised system. A second operation 24 defines or breaks down the system into multiple self contained services to simplify analysis. A third operation 26 performs the attack tree analyses previously noted on each service to identify possible compromised components that could be penetrated and/or damaged by attack. Methodology known as "attack tree modeling" is used herein to identify how a system (or service) may be compromised under attack. Attack trees for the present invention are developed by identifying the critical services in a system, analyzing the run-time architecture, and subsequently generating attack scenarios. A fourth operation 28 identifies components or items that are critical based on the mission objectives and the consequences of system failure. Critical or vulnerable components, items and/or resources in the service(s) are broadly summarized herein as "critical items". In a fifth operation 30, those critical items deemed possible to be compromised are identified. In a sixth operation 32, the critical items which were identified in operation 30 as susceptible to attack and the supporting architecture are then analyzed for the key survivability properties of resistance, recognition, and recovery from an attacker's viewpoint. The design task for attack prevention is to make the attack as difficult and/or costly as possible.

The survivability property "resistance" is the capability of a service to repel attacks. The survivability property "recognition" is the service's capability and function to detect and evaluate attacks as they occur. Methods to identify or perform resistance and recognition are known and are generally outside the scope of the present invention, and are therefore not discussed further herein. The survivability property "recovery" is the capability to maintain critical components and resources during attack, limit the extent of damage, and restore full services following attack. The process of exception-handling deals with the recovery aspects of survivability.

To further describe the attack tree analyses of the present invention, and referring generally to FIGS. 3A and 3B, an AND-decomposition of an exemplary attack tree model is represented by a graph 34 and by a textual expression 36 for use with the invention exception-handling process. For FIGS. 3A and 3B, the term $G_0$ in one aspect represents the mission of a critical system or item having items $G_1$ through $G_n$ which must each be realized to achieve the mission. Viewed from the standpoint of an attacker, FIG. 3A also represents a goal $G_0$ (e.g.: destruction of or interference with mission $G_0$) that can be achieved if the attacker successfully attacks all of the items (for example subsystems) represented by items $G_1$ through $G_n$.

Referring next to FIGS. 4A and 4B, an OR-decomposition of an exemplary attack tree model is similarly represented by a graph 38 and by a textual expression 40. Again, viewed from the standpoint of an attacker, FIGS. 4A and 4B represent a goal $G_0$ (e.g.: destruction of or interference with mission $G_0$) that can be achieved. The OR-decomposition for this mission requires the attacker to only successfully attack any one of the items $G_1$ through $G_n$.

Referring next to FIGS. 5A and 5B, an attack tree identifying a system with AND-OR decomposition is shown by a graph 42 and a textual expression 44. In this example, in order to compromise mission $G_0$, an attacker has to first compromise any one of subsystems $G_1$, $G_2$ or $G_3$. To compromise subsystem $G_1$, an attacker has to first compromise subsystems $G_4$ and $G_5$. To compromise subsystem $G_3$, an attacker has to first compromise either subsystem $G_6$, or both subsystems $G_8$ and $G_9$. One goal of the present invention is therefore to initially identify which of subsystems $G_1$, $G_2$ or $G_3$ is the most critical to the mission.

Figure 6:
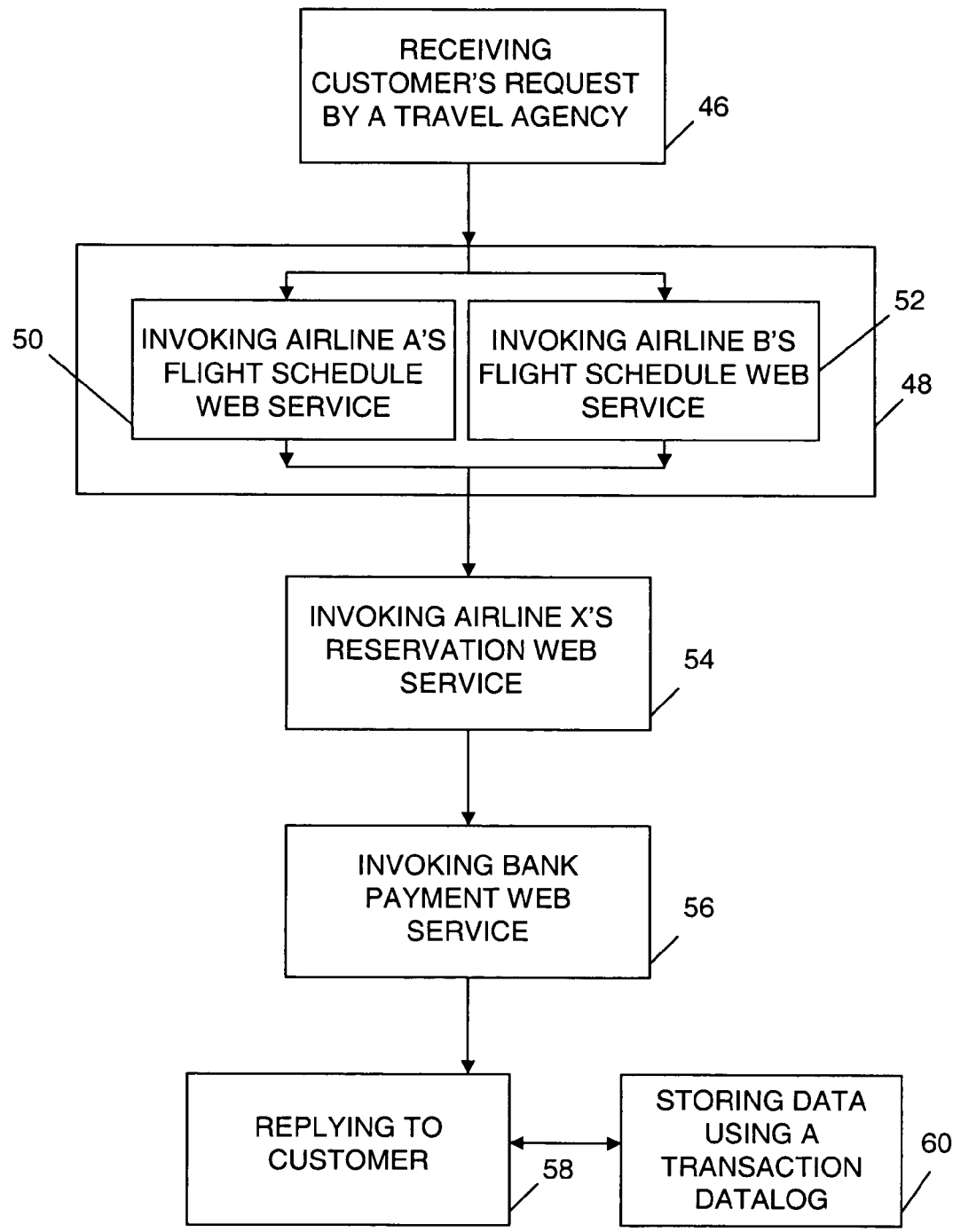
FIG. 6 is a block diagram of an exemplary travel reservation process.

As best seen in reference to FIG. 6, using a travel reservation example, the feasibility of supporting exception-handling in the context of a BPEL program for the present invention is provided. BPEL is provided as an example only. The invention is not limited to a specific program. Many companies provide services on the Internet for supporting automated business-to-business (B2B) applications, such as in this example, a travel reservation process. Business processes as referred to herein in general contain a set of activities that represent both business tasks and interactions between a variety of Web services. Because of standardization trends, the need to coordinate Web services to support various business processes in loosely coupled B2B environments is becoming more critical. BPEL provides a program which is adaptable for business processes.

In FIG. 6, four parties are involved: a travel agency, two airlines A and B, and a bank. Airlines A and B are selected from a variety of airlines that provide Web services such as "Check Flight Schedules" and "Make Reservations" on the Internet. The reservation system with the functionalities "decision making" and "compare options" interacts with other parties' Web services to complete a travel reservation. The exemplary travel reservation process illustrated in FIG. 6 is described as follows. In a first operation 46, the travel agency receives a customer request to make a travel reservation. The request may include information defining origin, destination, and day and month of travel, or the like. Based on the request parameters, the Web services for at most two airlines (A and B) and one bank are selected. In a combined operation 48, the travel reservation system performs two sub-operations, an "invoking airline A's flight schedule Web service" sub-operation 50, and an "invoking airline B's flight schedule Web service" sub-operation 52, to retrieve flight schedules. In a following operation 54, when the results are returned from both airline A and B's Web services, the travel reservation system performs an operation "invoking airline X's reservation web service" using a selected one of the airline's (A or B) reservation Web services to make a reservation. Once the travel reservation system receives a confirmation from the airlines' Web service, in a next operation 56, the system performs an "invoke bank payment Web service" operation to process a payment transaction. Next, in an operation 58 the travel reservation system performs a "replying to customer" operation, providing the customer with reservation information. Finally, in an operation 60, the travel reservation system stores relevant data of the transaction using a "storing data in transaction datalog" operation. If Airline A's Web service fails to handle the request from the travel agency because of its internal error or an attack, the travel reservation system considers this error as an exception. In this situation, it is likely that the customer's business will flow into Airline B's (or another Airline's) Web service because the travel agency may have to reply to its customers within a certain time limit. It should therefore be evident that survivability is very important to both the travel agency and both airlines A and B.

The above operation 60 manipulates and stores data using a transaction datalog 62, which uses a fragment of Concurrent Transaction Logic, an extension of classical logic that seamlessly integrates concurrency and communication with queries and updates. Transaction Datalog 62 provides at least three operators for combining simple programs into more complex programs: 1) sequential composition, denoted "$\otimes$"; 2) concurrent composition, denoted "|"; and 3) a modality of isolation, denoted "−". In addition, logical rules provide a subroutine facility, as in classical Datalog. In the syntax of transaction logic, the control-flow of the "Travel Reservation Process" of FIG. 6 is represented as a control flow procedure "S" as follows:

Control Flow Procedure S:

T control-flow←
  "Receive Customer's Request"$\otimes$("Invoke Airline A's Flight Schedule Web Service"|"Invoke Airline B's Flight Schedule Web Service") $\otimes$"Invoke Airline x's Reservation Web Service"$\otimes$"Invoke Bank Payment Web Service"$\otimes$"Reply to Customer"

Where the symbol "$\otimes$" identifies serial conjunction between two activities and the symbol "|" identifies concurrent conjunction for two or more activities.

Figure 7:
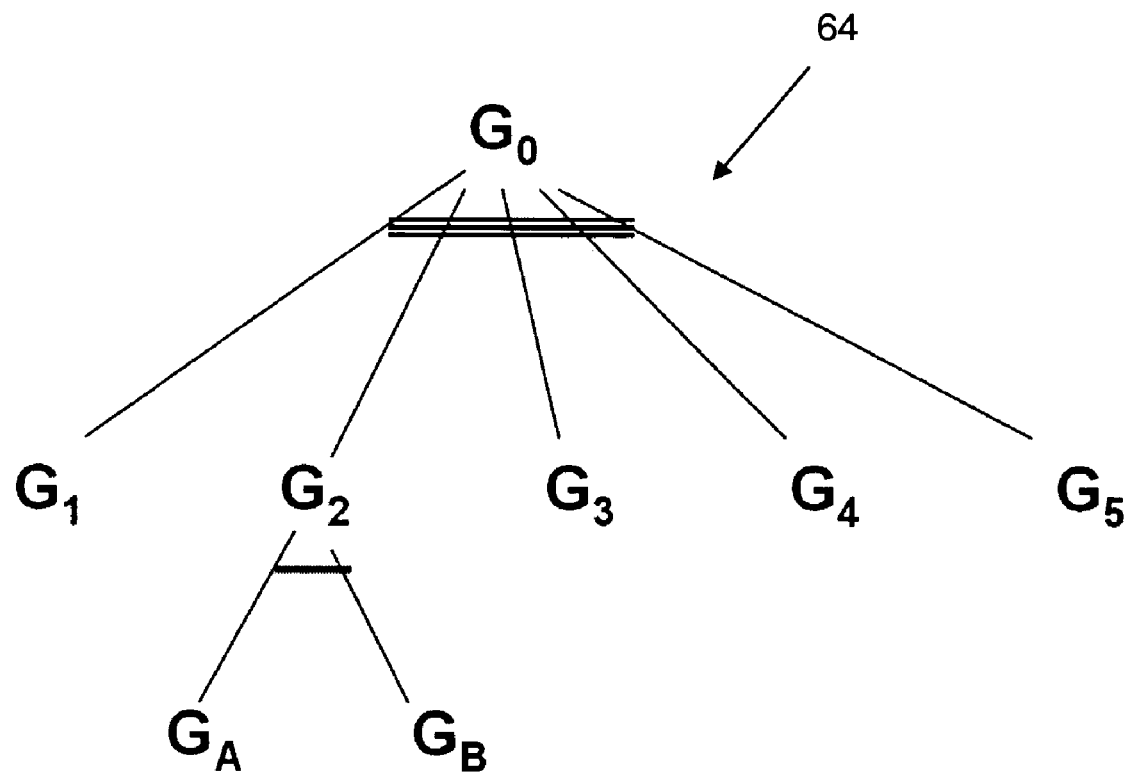
FIG. 7 is an attack tree analysis of a control flow of the travel reservation process identified in FIG. 6.

Referring now to both FIGS. 6 and 7, an attacker who has access to the control flow identified above using BPEL will be able to deduce an attack tree 64 as shown. From attack tree 64, the attacker can compromise the mission of the Travel Reservation process of FIG. 6, identified as system ($G_0$), using any one of the following attack scenarios: $\{G_1\}$, $\{G_4, G_B\}$, $\{G_3\}$, $\{G_4\}$, or $\{G_5\}$. Scenario $\{G_4, G_B\}$ will be further evaluated. One purpose of exception handling system 10 is to allow continuation of workflow execution for scenarios such as scenario $\{G_4, G_B\}$. Referring to the control-flows of this scenario, there are two circumstances in which a control exception can occur: 1) an activity-specific exception, or 2) a cross-activity exception. An activity-specific exception affects exactly one activity. A cross-activity exception can affect more than one activity.

For example, an activity-specific exception occurred at the "Invoking Airline A's Flight Schedule Web Service" operation 50. In this case, the "Invoking Airline A's Flight Schedule Web Service" operation 50 is effected. An exception-flow of exception handling system 10 revises the control-flow "T" using a forward recovery rule "U" as follows:

Forward Recovery Rule U:

V ∃ control-exception ("Invoke Airline A's Flight Schedule Web Service", Forward-Recovery)→

W control-flow'←
  "Receive Customer's Request"$\otimes$"Invoke Airline B's Flight Schedule Web Service"$\otimes$"Invoke Airline B's Reservation Web Service"$\otimes$ "Invoke Bank Payment Web Service" $\otimes$ "Reply to Customer"

As described by the above forward recovery rule "U" (if V then W), once a control exception "V" exists at the "Invoking Airline A's Flight Schedule Web Service" operation 50 that can be handled by a forward recovery rule, an exception-flow of exception handling system 10 recovery rule "U" revises the original control-flow "T" of procedure "S" into a new control-flow "W".

Referring again to FIG. 6, a cross-activity exception is also identified. The cross-activity exception occurs at both "Invoke Airline A's Flight Schedule Web Service" and "Invoke Airline B's Flight Schedule Web Service" operations 50, 52. In this situation, a forward recovery rule "X" of exception handling system 10 having an exception-flow "Y" revises the control-flow "T" by following forward recovery rule "X" (if Y then Z) involving a third Airline C as follows:

Forward Recovery Rule X:

Y ∃ control-exception (["Invoke Airline A's Flight Schedule Web Service", "Invoke Airline B's Flight Schedule Web Service"], Forward-Recovery)→

Z control-flow←

"Receive Customer's Request"⊗"Invoke Airline C's Flight Schedule Web Service" ⊗ "Invoke Airline C's Reservation Web Service"⊗"Invoke Bank Payment Web Service"⊗"Reply to Customer"

As shown by the above forward recovery rule "X" (if Y then Z), once a control exception "Y" exists at both the "Invoke Airline A's Flight Schedule Web Service" and "Invoke Airline B's Flight Schedule Web Service" operations 50, 52 that can be handled by a forward recovery rule, an exception-flow of exception handling system 10 revises the original control-flow "T" into a new control-flow "Z".

If the workflow designer cannot identify or create a feasible exception-handling rule, the problematic activity has to abort, and the user request has to abort as well. This is known as failure determination and is an undesirable situation in workflow execution. The present invention workflow system therefore provides a termination mechanism to prevent workflow exceptions from triggering each other indefinitely. The termination mechanism is described in the article "Behavior of Database Production rules: Termination, Confluence, and Observable Determinism", by A. Aiken, J. Widom, and J. M. Hellerstein, published in *Proceedings of the ACM SIGMOD Conference on Management of Data*, pp. 59-68, 1992, the subject matter of which is incorporated herein by reference.

Based on the previous examples identified above in reference to FIG. 6, the exemplary BPEL program for the "Travel Reservation Process" focuses on the first three activities of the travel reservation process. The technical details of each activity are as follows:

"receive" allows the business process to do a blocking wait for a matching message to arrive, e.g., travel Agency.

"invoke" allows the business process to invoke a one-way or request-response operation on a portType offered by a partner, e.g. airline A and/or airline B.

It is also noted BPEL version BPEL4WS includes a mechanism to define how individual or composite activities within a process are compensated in cases where exceptions occur or a partner requests reversal. Error handling in business processes therefore relies on the concept of compensation, that is, application-specific activities that attempt to reverse the effects of a previous activity that was carried out as part of a larger unit of work that is being abandoned.

Each of the activities in a flow model for distributed software systems must be able to be executed by an appropriate Web service. The role of a Web services broker is to assign an appropriate Web service for each activity based on the operations provided by the Web service and the requirements specified by the activity. This assignment process is commonly known as "matchmaking".

Figure 8:
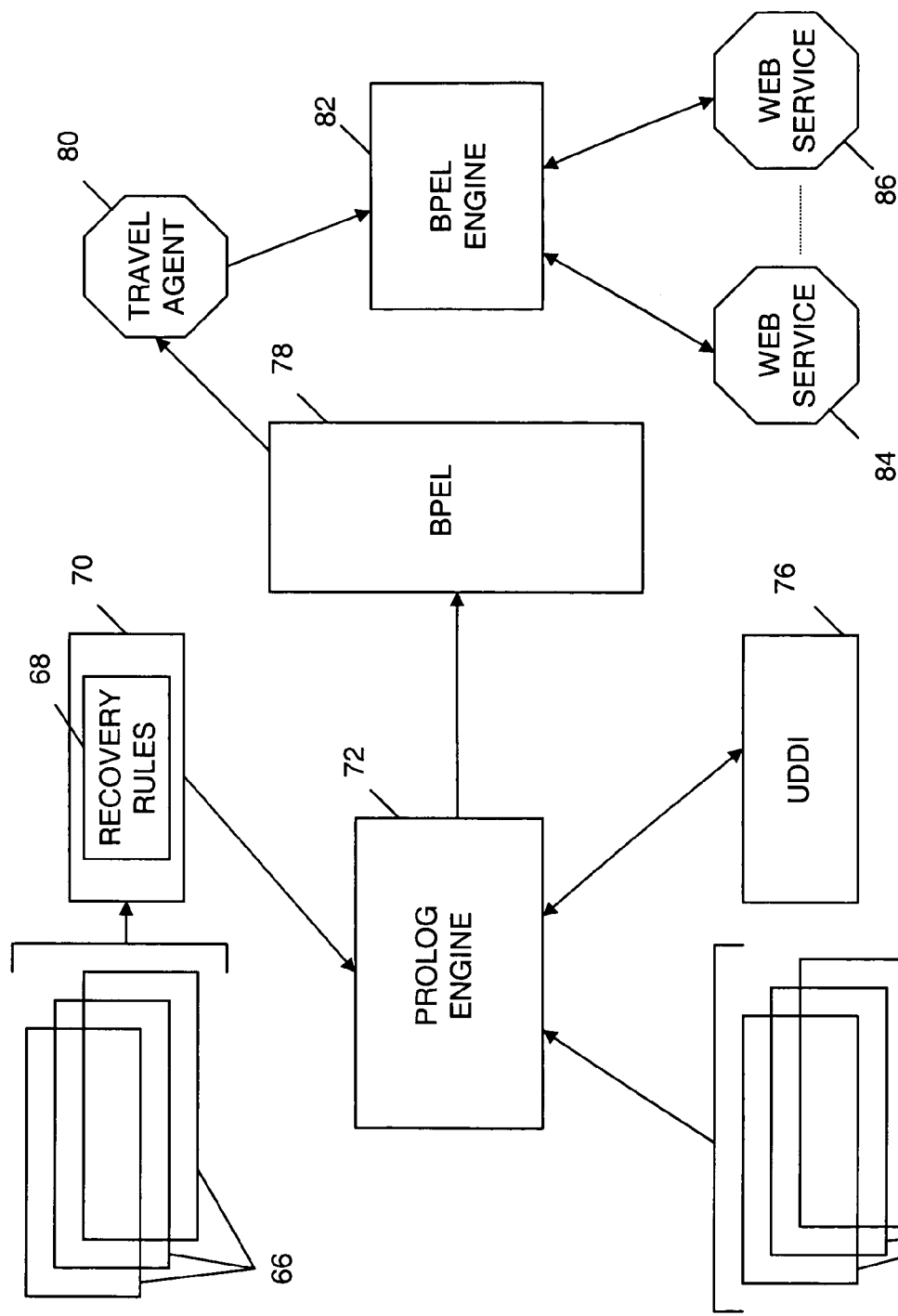
FIG. 8 is a block diagram of an overlay system for the dynamic exception handling system of the present invention.

Referring now generally to FIG. 8, an operational state of exception handling system 10 is represented. A plurality of attack modeling operations 66 are initially carried out, one for each service. The results of the attack modeling operations 66 are used to develop one or more recovery rules 68 (also referred to as recovery procedures) as part of a rule generation operation 70. The recovery rules 68 are available to a prolog engine 72. Data from one or more operations in the form of dynamic workflows 74 are monitored by prolog engine 72 and any workflow exceptions that have occurred are identified. The above noted matchmaking process can be carried out by a UDDI service 76 in communication with prolog engine 72. UDDI service 76 contains the information for all the services available at that present time which are updateable into prolog engine 72. A program 78 such as BPEL used in conjunction with prolog engine 72 provides input capability and output results to a client 80 identified as an exemplary travel agent. An engine 82 (in one example a BPEL engine) communicates with a plurality of mobile networks such as web services 84, 86. During monitoring of dynamic workflows 74, recovery rules 68 are applied as forward recovery logic by prolog engine 72 via program 78 when exceptions are identified to any of the dynamic workflows 74. Recovery rules 68 are applied automatically, i.e., without the need for human intervention.

Figure 9:
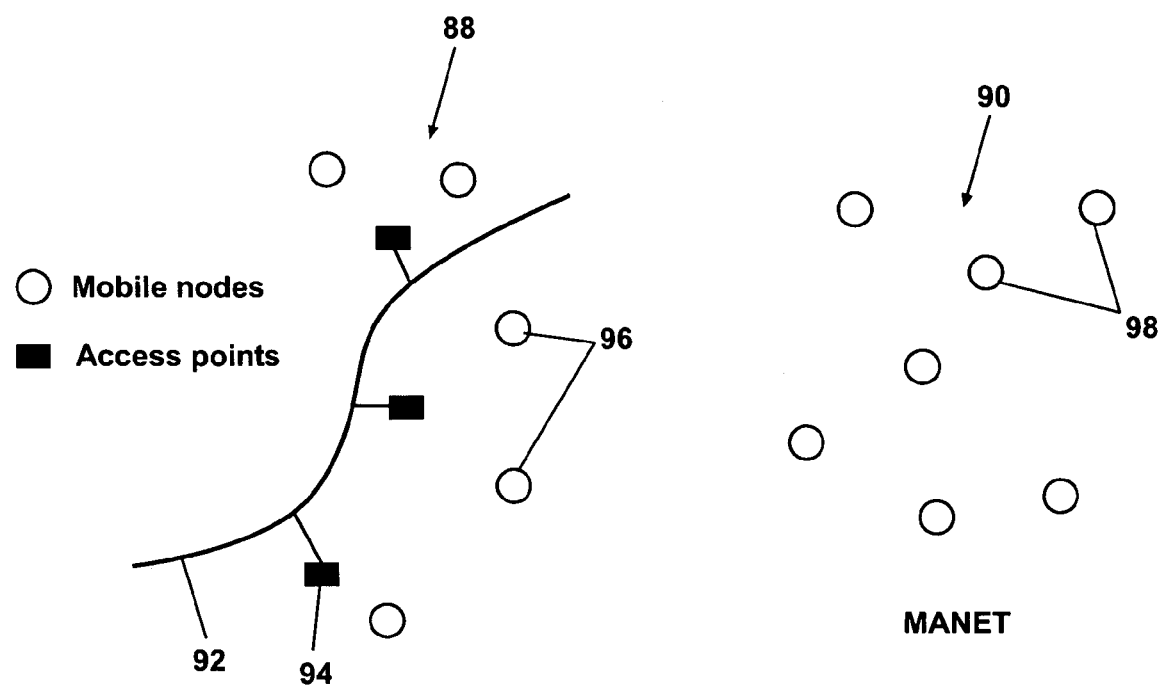
FIG. 9 is a block diagram identifying the differences between a standard wireless mobile network and a mobile ad-hoc network.
Figure 10:
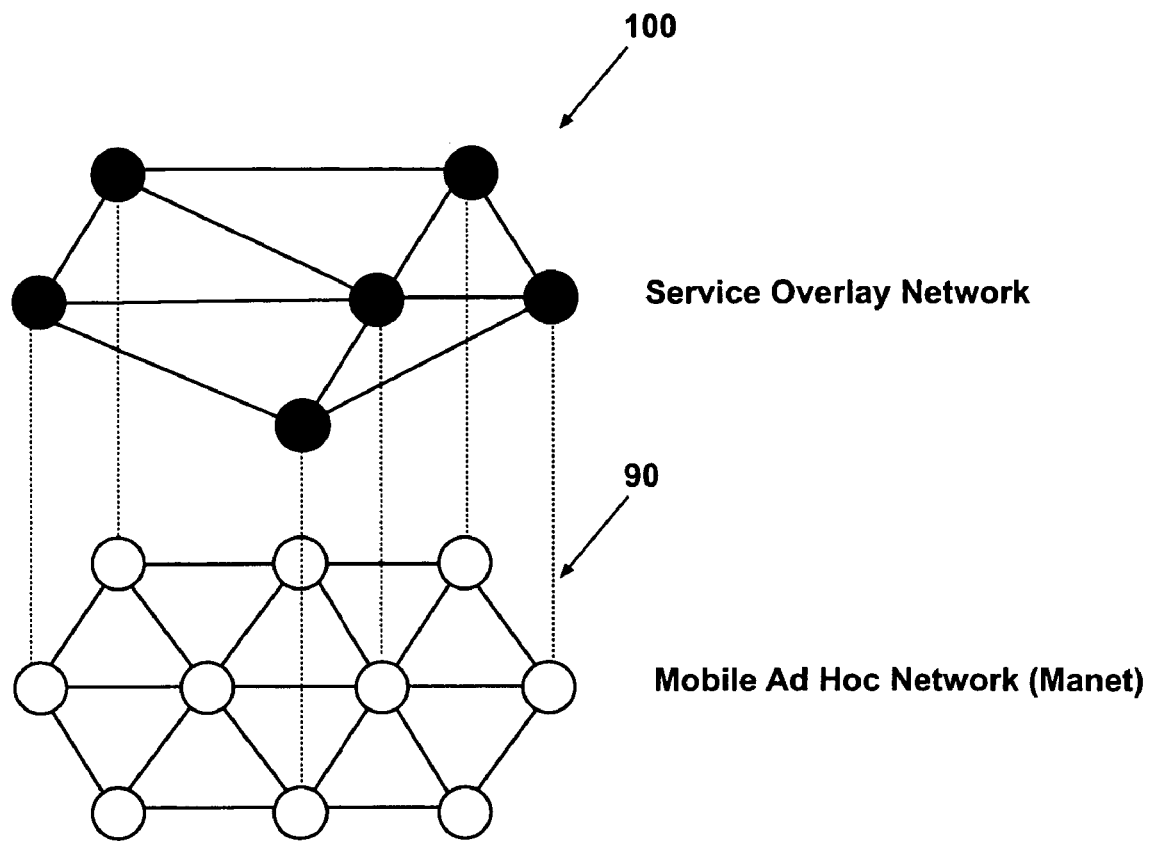
FIG. 10 is a block diagram identifying how the system of the present invention is overlayed with a mobile ad-hoc network.

Referring now to FIGS. 8 through 10, a wireless mobile underlying network 88 is differentiated from a mobile ad-hoc network (MANET) 90. Wireless underlying networks 88 normally include a fixed or interconnected portion 92 having a plurality of access points 94 each operable to wirelessly communicate with one or more mobile nodes 96 such as communication devices or processors in aircraft or mobile vehicles. Topographical and/or spatial features between access points 94 can preclude connection to network 88. Mobile nodes 96 can enter or leave the network at any time and at various locations relative to the access points 94. Because mobile nodes 96 can dynamically shift and therefore be in positions where wireless contact is unavailable due to topology or due to system failures or attacks, wireless underlying networks 88 are unreliable. In contrast to network 88, MANET networks 90 include a plurality of mobile nodes 98 which can communicate with each other through a non-centralized network.

To overcome the unreliability of wireless networks 88, adaptive measures are provided at a service overlay level with a MANET network for the exception handling system 10 of the present invention. To be adaptive, the overlay system dynamic workflow model such as shown in FIG. 8 which utilizes forward recovery rules, needs, at a minimum, to be able to take recovery action. As shown in FIG. 10, the present invention provides an architecture 100 which is overlayed on a mobile ad-hoc network (MANET 90). The overlay features of the present invention allow dynamic adaptation to changes in topology and/or to failures such as from attacks, permitting necessary workflow exception-recovery action. Because exception handling system 10 of the present invention is not hardware or software limited, multiple types of devices can also work together inter-operably in each network.

An external client (such as a travel agent in the examples provided herein) can rely on exception handling system 10 to discover, for example, the best collaboration sequence of Web services available at the time, even in the presence of attacks and failures. Recovery from attacks is addressed by recovery rules 68 codified in terms of Transaction Datalog 62. The recovery rules 68 are the result of survivability analyses provided by attack tree modeling done on the distributed system as a risk management measure. The recovery rules 68 are processed by an engine such as prolog engine 72. An exemplary source for prolog engine 72 is the engine developed by the Toronto University. The prolog engine 72 receives information about the changes of state in exception handling system 10, such as topological changes due to mobility, or changes due to attacks.

An exception handling system 10 of the present invention provides several advantages. By providing adaptive measures at the service overlay level for distributed software systems, multiple types of devices can be inter-operable and each can individually recover from system attacks or signal degradation due to movement of the nodes. The end-to-end methodology of the present invention captures initial results from attack tree modeling to develop recovery rules for critical system items. The recovery rules can be applied dynamically using forward recovery when system exceptions occur, including exceptions caused by attacks. The system of the present invention is capable of dynamically generating new workflows for distributed software systems and is therefore functional to improve survivability and recovery from system attacks.

While various preferred embodiments have been described, those skilled in the art will recognize modifications or variations which might be made without departing from the inventive concept. For example, the term mobile vehicle used herein can include aircraft, automobile vehicles, trucks, mobile military platforms, ships, trains, space vehicles, mobile communication equipment or systems, and the like. The examples also describe application to business systems and business software. The invention is not limited to business systems or business software, and can also include any type of software or program functioning at least in part over a wireless environment. The examples illustrate the invention and are not intended to limit it. Therefore, the description and claims should be interpreted liberally with only such limitation as is necessary in view of the pertinent prior art.

What is claimed is:

1. An exception handling method for dynamically recovering from a workflow exception occurring in a mobile network communication system, the system having multiple workflows and at least one mission critical item, the method comprising:
   creating a workflow specification for a plurality of items;
   performing attack tree modeling analyses using a computer on the items of the workflow specification to operably identify a plurality of mission critical items;
   performing a writing operation by writing a plurality of different recovery rules operable to protect the mission critical items using a transaction datalog fragment of transaction logic;
   using a datalog having the plurality of recovery rules stored therein, the recovery rules constructed to address the mission critical items, and the datalog enabling the recovery rules to be implemented;
   using a prolog engine implemented in a processing subsystem controlled by a processor, and overlaying the mobile network communication system to monitor, in real time, the multiple workflows for indication of a system attack on any one of the multiple workflows;
   using the prolog engine to detect and identify an exception, in real time, arising that relates to a specific one of the multiple workflows;
   using the prolog engine to determine and to select a specific one of the recovery rules, in real time, that is to be used to address the exception to the specific one of the multiple workflows;
   using the selected recovery rule stored in the datalog to automatically generate a new workflow, upon detection of the system attack on the specific one of the multiple workflows, the new workflow adapted to overcome the detected exception for the specific one of the multiple workflows;
   connecting the prolog engine to a UDDI service; and
   applying at least one of a sequential composition operator, a concurrent composition operator, and a modality of isolation operator during the writing operation.

2. The method of claim 1, further comprising identifying ones of the plurality of critical system items susceptible to a system attack.

3. The method of claim 2, further comprising preparing at least one recovery rule for each of the ones of the plurality of critical system items susceptible to the system attack.

4. The method of claim 1, further comprising writing the automatically generating operation as a forward recovery exception handling rule.

5. The method of claim 1, further comprising:
   identifying a control exception occurring during the monitoring operation; and
   generating a new control flow using the plurality of recovery rules.

6. The method of claim 1, further comprising:
   configuring the recovery rules for application at a service overlay level; and
   overlaying the recovery rules on a mobile ad-hoc network.

7. An exception handling method for dynamically recovering from a workflow exception occurring in a mobile network communication system, the system having multiple workflows and at least one mission critical item, the method comprising:
   creating a workflow specification for a plurality of items;
   performing attack tree modeling analyses using a computer on the items of the workflow specification to operably identify a plurality of mission critical items;
   performing a writing operation by writing a plurality of different recovery rules operable to protect the mission critical items using a transaction datalog fragment of transaction logic;
   using a datalog having the plurality of recovery rules stored therein, the recovery rules constructed to address the mission critical items, and the datalog enabling the recovery rules to be implemented; through an engine overlaying the mobile network communication system;
   using a prolog engine implemented in a processing subsystem controlled by a processor, and overlaying the mobile network communication engine, to monitor the multiple workflows in real time, for indication of a system attack on any one of the multiple workflows;
   using the prolog engine in connection with a program in communication with the prolog operation to detect and identify, in real time, an exception arising that relates to a specific one of the multiple workflows;
   using the prolog engine to determine and to select a specific one of the recovery rules, in real time, that is to be used to address the exception to the specific one of the multiple workflows;
   using the program to apply a selected recovery rule stored in the datalog to automatically generate a new workflow, upon detection of the system attack on the specific one of the multiple workflows, in real time, the new workflow adapted to overcome the detected exception for the specific one of the multiple workflows;
   using the program to communicate the new workflow to a user of the system; when an exception is detected for a workflow for which no recovery rule is available, using a termination mechanism to prevent additional workflow exceptions from being triggered;
   connecting the prolog engine to a UDDI service; and
   applying at least one of a sequential composition operator, a concurrent composition operator, and a modality of isolation operator during the writing operation.

8. An exception handling method for dynamically recovering from a workflow exception occurring in a mobile network communication system, the system having multiple workflows and at least one mission critical item, the method comprising:
   creating a workflow specification for a plurality of items;
   performing attack tree modeling analyses using a computer on the items of the workflow specification to operably identify a plurality of mission critical items;

performing a writing operation by writing a plurality of different recovery rules operable to protect the mission critical items using a transaction datalog fragment of transaction logic;

using a datalog having the plurality of recovery rules stored therein, the recovery rules constructed to address the mission critical items, and the datalog enabling the recovery rules to be implemented;

using a prolog engine implemented in a processing subsystem, and overlaying the mobile network communication system, to monitor, in real time, the multiple workflows for indication of a system attack on any one of the multiple workflows;

using the prolog engine to detect and identify an exception, in real time, arising that relates to a specific one of the multiple workflows;

using the prolog engine to determine and to select a specific one of the recovery rules, in real time, that is to be used to address the exception to the specific one of the multiple workflows;

using the prolog engine to access a universal description, detection and integration (UDDI) service to assist in implementing the recovery rules;

using the selected recovery rule stored in the datalog, and the UDDI service, to automatically generate a new workflow, in real time, upon detection of the system attack on the specific one of the multiple workflows, the new workflow adapted to overcome the detected exception for the specific one of the multiple workflows; and applying at least one of a sequential composition operator, a concurrent composition operator, and a modality of isolation operator during the writing operation.

* * * * *